US007610459B2

(12) United States Patent
Boyd et al.

(10) Patent No.: US 7,610,459 B2
(45) Date of Patent: *Oct. 27, 2009

(54) MAINTAIN OWNING APPLICATION INFORMATION OF DATA FOR A DATA STORAGE SYSTEM

(75) Inventors: Kenneth Wayne Boyd, Tucson, AZ (US); Donna Eng Dillenberger, Yorktown Heights, NY (US); Robert Frederic Kern, Otter Rock, OR (US); William Frank Micka, Tucson, AZ (US); Jeffrey William Palm, Rochester, MN (US); David Michael Shackelford, Tucson, AZ (US); Mark Francis Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/734,059

(22) Filed: Apr. 11, 2007

(65) Prior Publication Data

US 2008/0256309 A1 Oct. 16, 2008

(51) Int. Cl.
*G06F 12/16* (2006.01)
*G06F 3/00* (2006.01)
(52) U.S. Cl. .................. 711/161; 710/5; 710/8; 710/9; 710/10; 710/16; 710/33; 711/154; 711/162; 714/6; 714/15
(58) Field of Classification Search .................. 711/161, 711/154, 162; 395/182; 710/5, 8–10, 16, 710/33; 714/6, 15
See application file for complete search history.

(56) References Cited

U.S. PATENT DOCUMENTS

| 4,420,819 | A  | * | 12/1983 | Price et al. | ..................... 710/52 |
| 5,504,861 | A  | * | 4/1996  | Crockett et al. | ............... 714/13 |
| 5,557,742 | A  | * | 9/1996  | Smaha et al. | .................. 726/22 |
| 5,734,818 | A  | * | 3/1998  | Kern et al. | ..................... 714/20 |
| 6,044,444 | A  | * | 3/2000  | Ofek | ........................... 711/162 |
| 6,173,377 | B1 | * | 1/2001  | Yanai et al. | .................. 711/162 |
| 6,631,480 | B2 | * | 10/2003 | Zeigler et al. | .................. 714/20 |
| 6,745,310 | B2 | * | 6/2004  | Chow et al. | .................. 711/170 |
| 6,874,104 | B1 | * | 3/2005  | Josten et al. | .................. 714/15 |
| 7,096,392 | B2 | * | 8/2006  | Sim-Tang | ..................... 714/48 |
| 7,467,168 | B2 | * | 12/2008 | Kern et al. | .................. 707/204 |

(Continued)

FOREIGN PATENT DOCUMENTS

WO 2004/066082 5/2004

OTHER PUBLICATIONS

"Input/Output Event Analysis", IBM Technical Disclosure Bulletin, vol. 40, No. 07, Jul. 1997, pp. 117-128.

*Primary Examiner*—Tammara Peyton
(74) *Attorney, Agent, or Firm*—John H. Holcombe

(57) ABSTRACT

A data storage system writes data supplied from a host to data storage in accordance with write I/O of an owning application. A workload manager directs the processing of the supplied data in accordance with the write I/O of the owning application, provides service workload identification describing the write I/O, a storage subsystem control adds the service workload identification to record set information for the data, and a journal management system stores the record set information in a journal. The journaled information, for example, may be employed for performing forensic analysis of data corruption events or to perform security audits, etc.

15 Claims, 5 Drawing Sheets

U.S. PATENT DOCUMENTS

2005/0086529 A1* 4/2005 Buchsbaum ................ 713/201
2005/0203881 A1* 9/2005 Sakamoto et al. ............. 707/3
2007/0073519 A1* 3/2007 Long .......................... 702/185
2008/0016300 A1* 1/2008 Yim et al. ................... 711/162

* cited by examiner

| TOTAL DATA LENGTH | OPERATIONAL TIME STAMP | TIME INTERVAL GROUP NUMBER | SEQUENCE NUMBER WITHIN GROUP | PRIMARY SSID | SECONDARY TARGET VOLUME | RECORDS READ TIME | SERVICE WORKLOAD IDENTIFICATION |
|---|---|---|---|---|---|---|---|
| 501 | 502 | 503 | 504 | 505 | 506 | 507 | 100 |

PREFIX HEADER 500

FIG. 2

MAINTAIN OWNING APPLICATION INFORMATION OF DATA FOR A DATA STORAGE SYSTEM

CROSS REFERENCE TO RELATED APPLICATION

Commonly assigned U.S. application Ser. No. 11/734,097 filed on even date herewith relates to methods and computer program products configured to maintain owning application information of data for a data storage system.

DOCUMENT INCORPORATED BY REFERENCE

Commonly assigned U.S. Pat. No. 5,734,818 is incorporated for its showing of a data storage system configured to provide self describing record sets having prefix headers including time stamps of write I/O operations for data storage, for example, for time based sequence ordering of record updates of the data between primary and secondary data storage sites.

FIELD OF THE INVENTION

This invention relates to data storage system and more particularly to data storage systems configured to write data supplied from a host to data storage in accordance with write I/O of an owning application.

BACKGROUND OF THE INVENTION

Data storage systems provide storage of data from a host that is sufficiently reliable that the data may be deleted from the host. The reliability of the data storage is typically enhanced through replication of the data at primary storage and secondary storage. For example, the IBM® DS8000 supports an asynchronous data replication function such as that discussed in the incorporated '818 patent, which includes the data transfer required to provide the data for both the primary and secondary data storage. The data transfer may be journaled to effectively recreate data with I/O consistency from a known point in time of the data forward. The journals may be backed up to provide the ability to restore some or all data to any point in time covered by the backup versions.

It may be desirable for the customer to perform forensic analysis of data corruption events or perform security audits on which application updated what data when.

SUMMARY OF THE INVENTION

Data storage systems provide journaled information, for example, that may be employed for performing forensic analysis of data corruption events or to perform security audits, etc. The data storage systems may comprise one or more data storage control systems and devices, arranged as primary and/or secondary data storage.

In one embodiment, a data storage system is configured to write data supplied from a host to data storage in accordance with write I/O of an owning application, and comprises a workload manager configured to direct the processing of the supplied data in accordance with the write I/O of an owning application, configured to provide service workload identification for describing the write I/O, comprises at least one storage subsystem configured to add the service workload identification to record set information for the data, and comprises a journal management system configured to store information from the record set information in a journal, including the service workload identification.

In another embodiment, the storage subsystem is configured to add the service workload identification into a Read Record Set prefix, and the journal management system is configured to provide the information from the Read Record Set prefix to the journal.

In a further embodiment, the workload manager is configured to provide the service workload identification for a defined extent CCW which provides the service workload identification for the Read Record Set prefix.

In another embodiment, the workload manager is configured to provide the service workload identification for a prefix CCW which provides the service workload identification for the Read Record Set prefix.

In another embodiment, the service workload identification comprises a class of service defined for the owning application by the host.

In a further embodiment, the class of service comprises I/O priority information, and wherein the workload manager is configured to select the I/O priority information of the class of service.

For a fuller understanding of the present invention, reference should be made to the following detailed description taken in conjunction with the accompanying drawings.

BRIEF DESCRIPTION OF THE DRAWINGS

FIG. 2 is a data format diagram showing a prefix header of a read record set, having service workload identification in accordance with the present invention;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
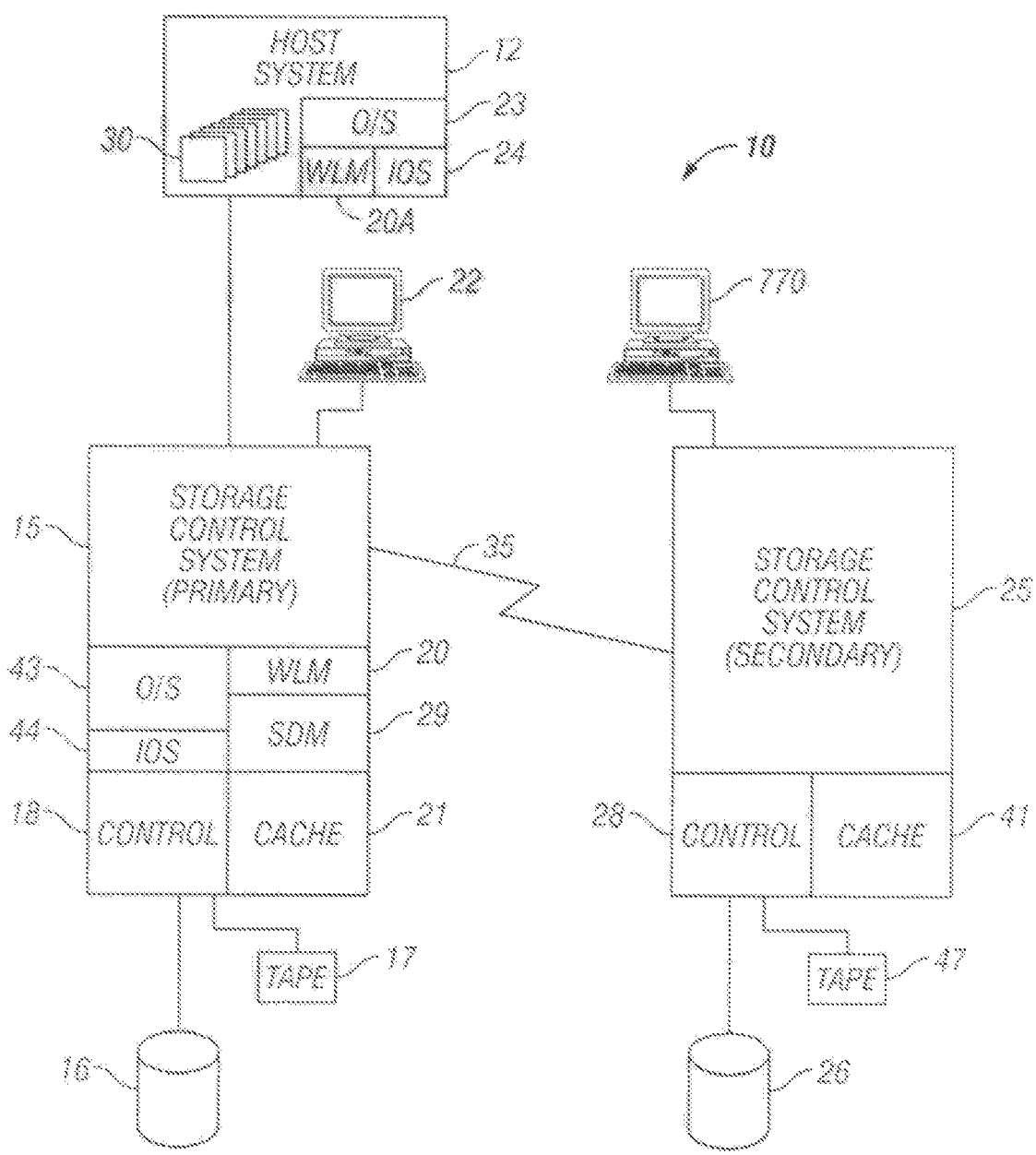
FIG. 1 is a block diagram showing a data storage system and host system, which may implement the present invention.

Referring to FIG. 1, a data storage system 10 is illustrated in conjunction with a host system 12. Typically, the host system 12, which may comprise one or more host processors, and may comprise a network, comprises applications 30 that generate data to be stored by the data storage system 10. The data storage system comprises, for example, a storage control system 15 having at least one subsystem control 18 and a number of drive devices 16, such as disk drives, for example, in the form of a RAID (Redundant Array of Independent Disks) for JBOD (Just a Branch of Disks). The storage control system 15 may also be in communication with long term storage such as magnetic tape or optical disks 17, for example, in the form of an automated data storage library. An example of a storage control system 15 that may be operated in accordance with the present invention comprises the IBM® DS 8000.

The storage system 10 incorporates a workload manager (WLM) 20, 20A configured to direct the processing of supplied data for storage. The workload manager 20, 20A may reside in the storage control system 15 or in a host system 12, or both. The storage system 10 comprises cache 21 for intermediate storage of data and of information employed in the operation of the storage system. The cache may also comprise disk storage, or may comprise a portion of the storage subsystem 16. In one embodiment, the workload manager 20A comprises a component of an operating system (O/S) 23 of the host system 12 along with an I/O subsystem (IOS) component 24. In an alternative embodiment, the workload manager 20 comprises a component of an operating system 43 of at least one processor of the storage control system 15 along with an I/O subsystem component 44.

The workload manager 20 and storage control system subsystem control 18, separately or together, may comprise program code and any suitable logic, microprocessor, and associated memory and/or data storage for responding to program code, and the associated memory and/or data storage may comprise fixed or rewritable memory or data storage devices. The workload manager 20 may comprise program code within the program code of the storage system 10, or may comprise an application employed by the storage system 10. The program code may be supplied to the storage system directly as from a data storage device or memory, for example by an input from an optical disk or floppy disk, for example at an operator panel 22 or drive of the storage system 10, or by being read from a magnetic tape cartridge, for example at a drive device 17, or from a network, for example via host system 12, or by any other suitable means. The workload manager 20 may be physically located at the host system 12, the storage control system 15 or any point in the data storage system 10, or spread across the data storage system.

The data storage system 10 may comprise primary and secondary sites, for example, with host system 12, storage control system 15 with drive devices 16 comprising the primary site, and storage control system 25 with subsystem control 28 and drive devices 26 comprising a secondary site. The data storage system may thus provide data storage at the primary site and shadow the data at the secondary site, transferring the data asynchronously, employing a storage data mover 29 to form consistency groups, as described in the incorporated '818 patent.

In the incorporated '818 patent, applications 30 at the primary site generate record updates, and a secondary site, for example, remote from the primary site, shadows the record updates. The data storage system 10 comprises a sysplex timer for synchronizing time dependent processes in the primary site. The primary storage control system 15 responds to write I/O operations for the record updates, and conducts write I/O operations to the primary storage subsystem 16 for each record update, the write I/O operations being synchronized to the sysplex timer. The primary storage subsystem 16 accordingly receives the write I/O operations and stores the data.

The primary subsystem control 18 sees that a write I/O operation is directed to a volume also stored at the secondary site, and builds a Read Record Set prefix with the specific storage information in its cache 21. The subsystem control thus collects record set information for each record update and appends a prefix header to a predetermined group of record set information. The prefix header and the predetermined group of record set information form self describing record sets, including the data updates.

The record set information includes, inter alia, a record update sequence number and a record update time. The prefix header includes, inter alia, an operational time stamp, a time interval group number, and a record read time.

The storage data mover 29 reads the RRS's from the subsystem control(s) 18 and forms consistency groups which are written to a journal, for example, stored in cache 21. The consistency groups are all I/Os of a small period of time. It is important that cross volume and cross storage control system data consistency is maintained. The record sets are transmitted over communication link 35 to a secondary storage control system 25 which orders the record updates from each consistency group for writing to the secondary storage control system 25 in an order consistent with a sequence that the record updates were written to the primary storage control system 15.

In one embodiment of the incorporated '818 patent, the storage data mover 29 creates a journal record for each self describing record, including the prefix header. The journal record may be transmitted to the secondary storage control system 25 and the information employed to form the consistency groups and to control the writing of the record updates to the secondary storage subsystem 26.

Figure 3:
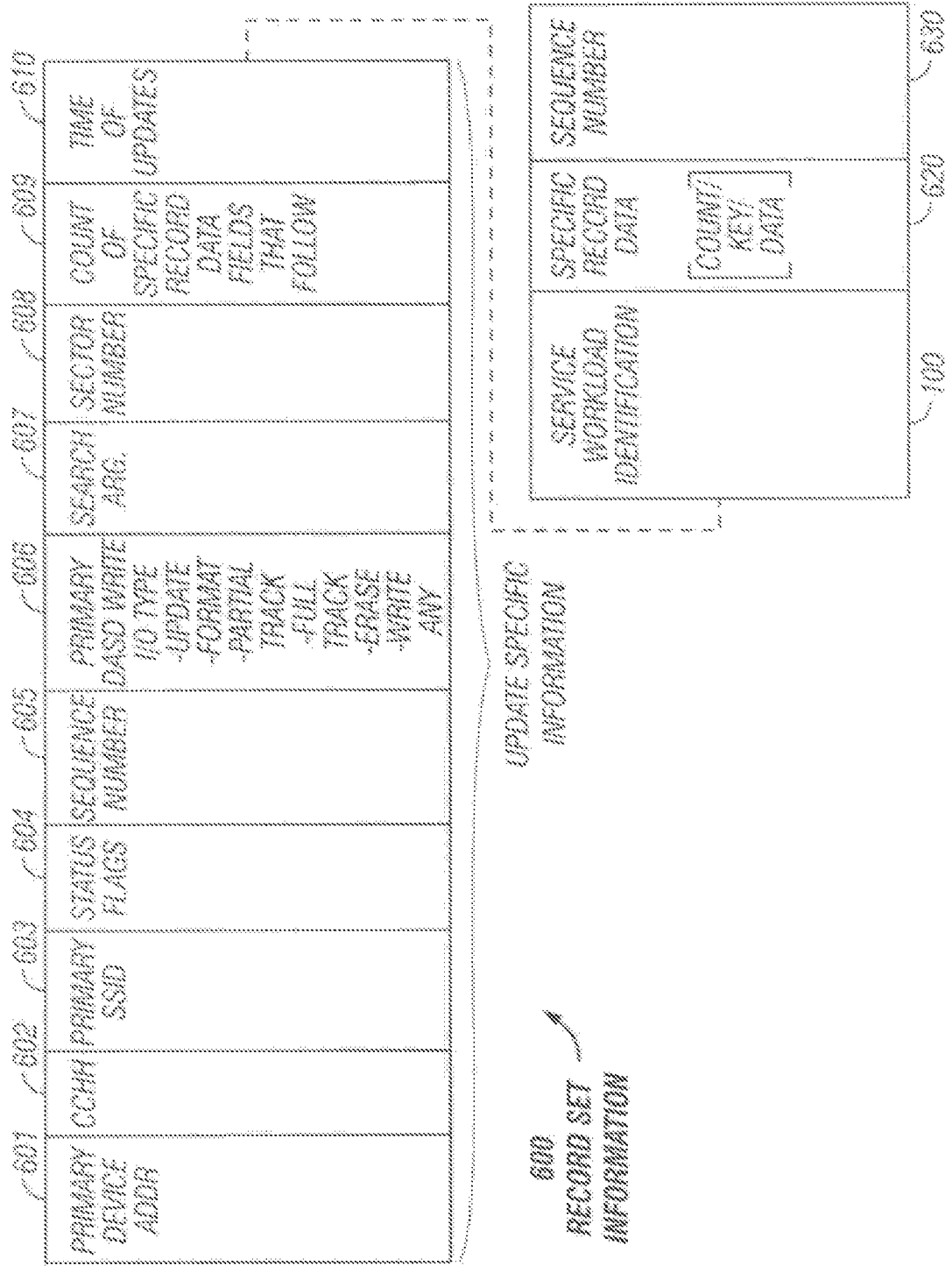
FIG. 3 is a data format diagram describing fields of a read record set, having service workload identification in accordance with the present invention.

Referring to FIGS. 1, 2 and 3, in one embodiment of the present invention, the data storage system 10 is configured to write data supplied from a host 12 to data storage in accordance with write I/O of an owning application 30. Examples of applications may comprise accounting, payroll, information management and data base applications, etc. The data storage may comprise a single device, a single site with multiple storage devices, a single site with multiple storage systems, primary and secondary sites as illustrated in FIG. 1, or primary and multiple secondary sites.

The present invention comprises data storage systems, methods and computer program products for providing journaled information, for example, that may be employed for performing forensic analysis of data corruption events or to perform security audits, etc., in which the owning applications of the I/O's are identified.

A workload manager 20 is configured to direct the processing of the supplied data with respect to the data storage system in accordance with the write I/O of an owning application 30. The workload manager 20 may be resident in the storage control system 15, the host 12 (illustrated as 20A), or both, and herein is considered to comprise an element of the data storage system 10. Herein, references to workload manager 20 also or alternatively refer to 20A. The storage control system 15 is configured to store data with respect to storage devices 16, and the storage control system 25 is configured to store data with respect to storage devices 26. The present invention can take the form of an entirely hardware embodiment, or an embodiment containing both hardware and software elements. In a preferred embodiment, the invention includes but is not limited to resident software, firmware, microcode, etc. Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain or store the program for use by or in connection with the instruction execution system, apparatus or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Network adapters may be coupled to the system to enable the data processing system to become coupled to other data processing systems or remote devices through intervening private or public networks. Modems, cable modems and Ethernet cards are just a few of the currently available types of network adapters.

The customer, via the host 12, defines what applications (workloads) 30 to assign to which class of service. A class of service designation may include or comprise an I/O priority. For example, an IBM® zOS computer operating system allows customers to initially define class of service for each application which is assigned to workload by the workload manager 20. There are currently some 100 unique classes available on each managed system. Defined in the class of service is an I/O priority which is given to each I/O operation for that class of service. The class of service may reflect the customer defined relative business priorities on a workload by workload basis. Herein, class of service or I/O priority, or any similar designation is called "service workload identification".

The workload manager 20 comprises an infrastructure to track and manage workloads via the class of service that the I/O chain is on behalf of, and as a result it can provide the information in the write chain in a manner similar to its providing I/O priority for the workload. The resultant unit of work information is preserved through the operating system function/middleware such that when the I/O is executed, the I/O priority that the customer has previously defined for that workload is sent with the I/O.

The workload manager 20 is configured to provide the service workload identification describing the write I/O for use by the I/O subsystem 24, 44. The workload manager is configured to provide the service workload identification for all I/O on behalf of a unit of work that is to be directed to the data storage system.

The I/O subsystem 24, 44 accesses the service workload identification from the workload manager (along with other information) and provides the service workload identification to the storage subsystem control 18 via a Channel Command Work (CCW) or equivalent. Examples of a CCW are the define extent CCW or prefix CCW. For example, the define extent CCW created is modified to provide some additional information including the service workload identification, and is added to a write I/O chain. Alternatively, a prefix CCW is generated and includes the service workload identification, and is added to a write I/O chain. Herein, the CCW's are termed "provided" by the workload manager without regard to the initial source of the CCW.

Referring to FIG. 2, the storage subsystem control 18 recognizes that the referenced I/O is directed to a volume that is or is to be stored in both the primary and secondary sites (termed as "XRC" or extended remote copy), and builds a Read Record Set prefix 500 with the specific storage information in its cache 21 as discussed above. Included in the Read Record Set prefix is the service workload identification 100 as provided by the workload manager 20. The remainder of the prefix header 500 is explained by the incorporated '818 patent and is related to the format for each self describing record set. The prefix header may comprise a total data length 501 for describing the total length of the prefix header 500 and the full primary record set information for the record set. An operational time stamp 502 is a time stamp indicating a start time for the operational set that is currently being processed. A time interval group number 503 identifies a time interval (bounded by operational time stamp 502 and a records read time 507) for which the current record sets belong. A sequence number within group 504 is derived based upon an identification of a write sequence order of application write I/Os for each record set within a given time interval group 503. A primary substorage identification (SSID) 505 uniquely identifies the specific storage controller of the primary storage control system 15 for each record set. A secondary target volume 506 is assigned, and a records read time 507 provides an operational time stamp that indicates an end time for the read record set process current interval. The operational time stamp 502 and the records read time 507 are used to group sets of read record sets from the primary storage control system 15.

Referring to FIG. 3, the record set information 600 is collected by the storage data mover 29 by reading all of Read Record Sets 500 from the subsystem control(s) 18 and the data mover forms the consistency groups. The record set information incorporates the service workload identification 100 from the Read Record Set prefix header 500.

The remainder of the record set information 600 is explained by the incorporated '818 patent and is related to the format for each self describing record set. Update specific information 601-610 includes a primary device unit address 601 of each record indicating the actual data storage device or set of devices (which may be virtual) that the record update occurred on. A cylinder number/head number (which may be virtual) indicates a location on the data storage device or set of devices. A primary storage controller session identifier (SSID) 603 is the same as the primary SSID 505. Status flags 604 provide status information, and sequence numbers 605 and 630 assign a number to each record for indicating whether the entire record set has been read from the host application. Write I/O type 606 is an indicator of the type of write operation performed on each record. Search argument 607 indicates initial positioning information for the first read record set data record 620. A sector number 608 identifies the sector that the record was updated at, and count field 609 describes a number of specific record data fields 620 that follow. A host application time when the write update occurred is recorded in time of updates 610. Specific record data 620 provides a count/key/data (CKD) field of each record update.

The collected information is journaled by a journal management system which may comprise part of the storage data mover 29 or of the workload manager, or which may be implemented as a separate application 30 of the host system 12. The journal management system is configured to store the record set information in a journal. In one embodiment, the journal is initially stored in cache 21. The journal forms a basis for forming consistency groups by the storage system 10 and operating the storage control system 25 to store the data of the consistency groups at storage drives 26. To this end, the journal may be transferred to the cache 41 of the secondary storage control system 25. The journal may be employed for continuous data protection operations during data shadowing operations. The journal continues to grow, for example for a shift or a days worth of data, and the journal management system maintains the information by offloading the journal to storage such as tape 17, employing the data storage system, and the journal provides the information to cover the specific time period of the shift or day. The data management system may alternatively or additionally offload the journal to storage such as tape 47. Thus, an existing journal entry is journaled together with all the information for all write I/O's that make up a specific point in time consistency group. That is, the information is for all write I/O's across all volumes on all storage subsystems defined in the particular logical session, and the journal is a collection of consistency groups based on time.

Figure 4:
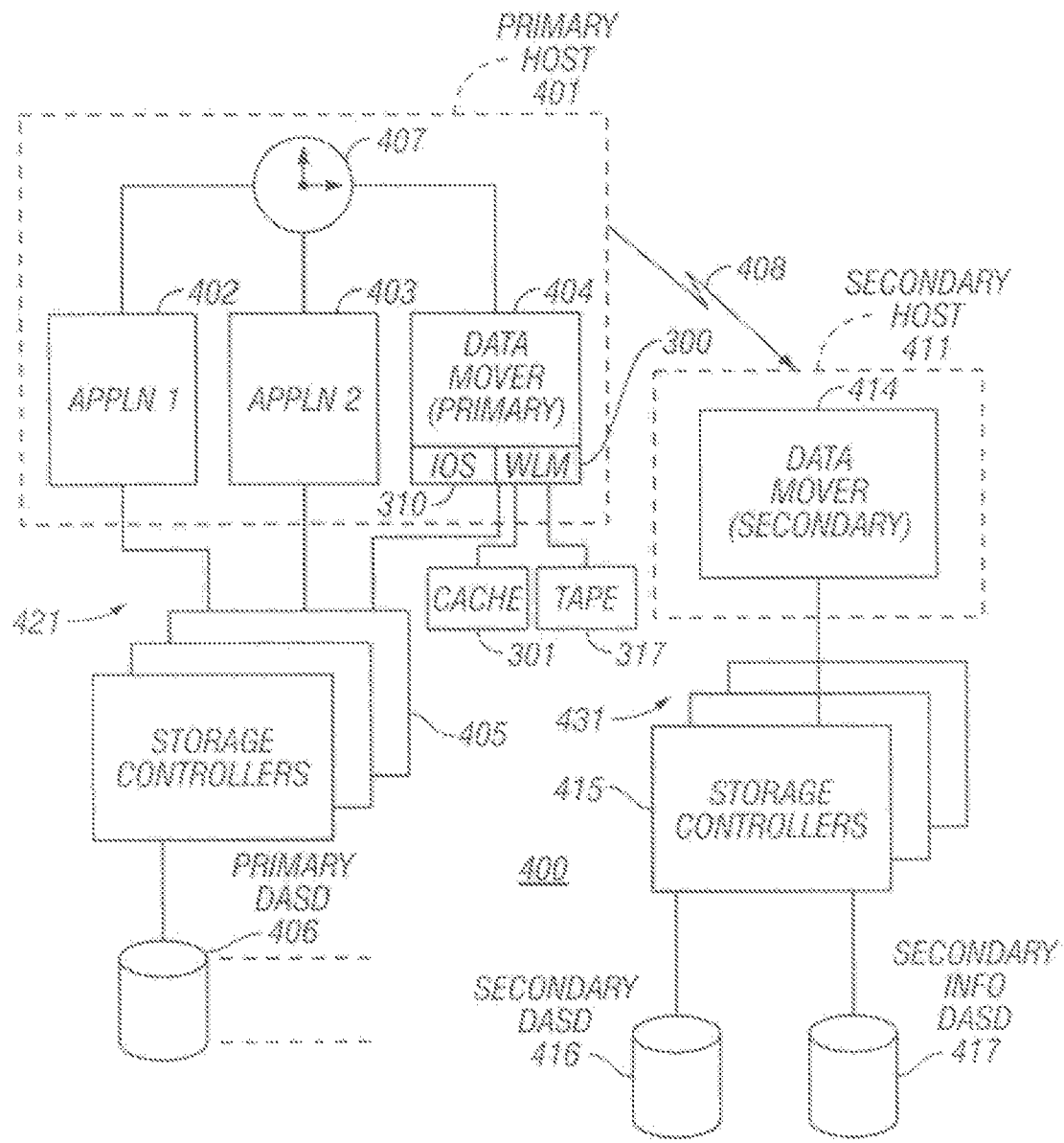
FIG. 4 is a block diagram showing an alternative embodiment of a data storage system and host systems for implementing the present invention.

Referring to FIG. 4, an alternative embodiment of a data storage system 400 is illustrated in which a primary host 401 provides the communications with respect to the secondary site through a secondary base 411. Two applications 402, 403 are illustrated and represent a potentially large number of applications. Data storage is run via a data mover 404 at the primary site 421, with a sysplex clock 407 of the primary host, and via a data mover 414 at a secondary site 431. This is an arrangement discussed by the incorporated '818 patent, wherein the host comprises at least one primary processor and at least one secondary processor. An example of a processor is the IBM® ES/9000 having data mover software. Also at each site are storage controllers 405 and 415 and direct access storage devices such as hard disk drives. Examples of storage controllers comprise IBM® 3990 storage controllers, and examples of data storage drives comprise IBM® 3390 DASD.

In accordance with the present invention, the workload manager 300 may be resident at the data mover 404. The workload manager 300 is configured to provide the service workload identification 100 of FIG. 2 for use by an I/O subsystem 310 to be provided to the storage subsystem storage controllers 405 via a Channel Command Word (CCW) or equivalent, such as the define extent CCW or the prefix CCW discussed above. The storage subsystem controllers 405 build Read Record Set prefix headers 500 for the XRC volumes. The record set information 600 of FIG. 3 is collected by the storage control system at data mover 404 and the data mover forms the consistency groups. The record set information incorporates the service workload identification 100 from the Read Record Set prefix header 500. The journal management system may be resident in or with the workload manager 300, and the collected information is journaled by the journal management system. In one embodiment, the journal is initially stored in cache 301. The journal comprises a basis for forming the consistency groups by the storage system at site 121 and the secondary data mover 414 is operated to store the data of the consistency groups at secondary DASD 416. To this end, the journal may be transferred to the control info DASD 417 of the secondary site 431. The journal may be employed for continuous data protection operations during data shadowing operations. The journal continues to grow, for example for a shift or a days worth of data, and the journal management system, via the data mover 404 or other element of the data storage system, offloads the journal to tape 317, and the journal provides the information to cover the specific time period of the shift or day, as discussed above.

Figure 5:
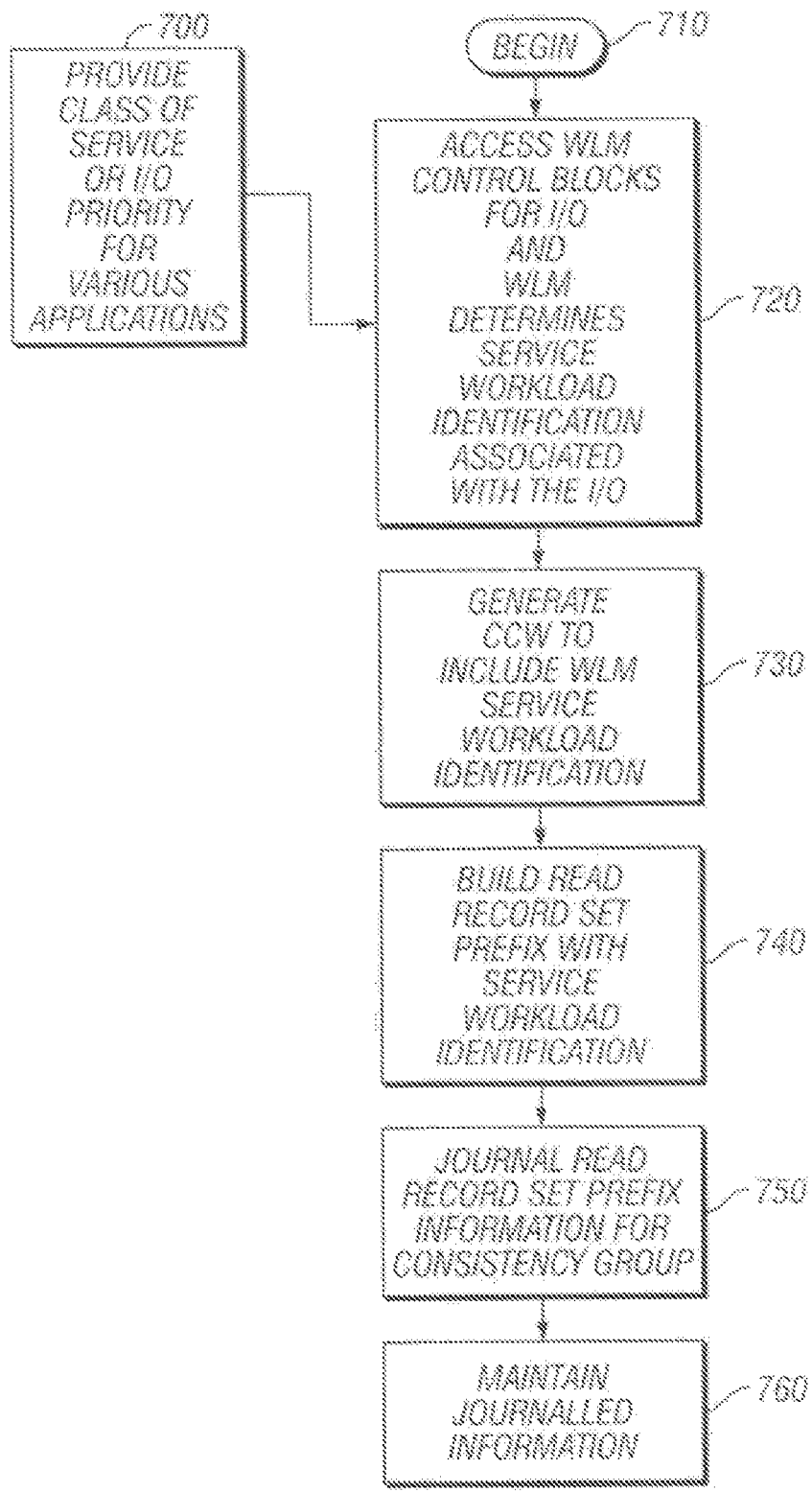
FIG. 5 is a flow chart depicting the functions implementing the present invention.

Referring to FIG. 5, functions implementing the present invention are depicted, and in step 700, the customer, via the host 12, 401 of FIGS. 1 and 4, has assigned a class of service or an I/O priority to each of the applications 30, or alternatively, to different I/O operations for the applications. A class of service designation may include or comprise an I/O priority, as discussed above. The class of service may reflect customer defined relative business priorities on a workload by workload basis. As discussed above, a class of service or I/O priority, or any similar designation is called "service workload identification".

Still referring to FIG. 5, beginning in step 710, the data storage system 10, 400 of FIGS. 1 and 4, is configured to provide the service workload identification describing the write I/O and to journal record set information with the service workload identification. In step 720, the workload manager 20, 300 accesses its control blocks to establish the class of service or the I/O priority for the current write I/O, and pulls the I/O priority for the governing class associated with this I/O operation. The service workload identification may comprise a class of service defined for the owning application by the host, wherein the class of service may define the I/O priority information. The workload manager is configured to select the I/O priority information or the class of service, and thereby identify the application to which the I/O belongs.

In step 730, the workload manager 20, 300 provides the service workload identification for adding the service workload identification to the define extent CCW or prefix CCW or equivalent, and the data storage system generates the CCW. The CCW's are discussed above. The CCW provides the service workload identification to the storage subsystem for each XRC I/O.

In step 740, the storage subsystem sees that the I/O is directed to an XRC volume and builds the Read Record Set prefix with the storage information in its cache, and includes the service workload identification 100 of FIG. 2 in the Read Record Set prefix header 500.

In step 750 of FIG. 5, the data storage system collects the Read Record Sets for consistency groups and the journal management system stores the record set information 600 in a journal, for example, in cache 21, 301 of FIGS. 1 and 4. The journal continues to grow, for example for a shift or a days worth of data, and the journal management system, via the data mover 404 or other part of the data storage system, maintains the information by offloading the journal to storage such as tape 17, 47, 317, in step 760, and the journal provides the information to cover the specific time period of the shift or day, as discussed above. Herein, the creation of the journal entries is deemed conducted by the journal management system without regard for the specific application or applications performing the specific collection and arrangement of the information, nor the formation and storage of the information as journal entries.

Thus, the journal entries are journaled together by consistency group and form the information for all write I/O's for the time period of the shift or day, and each has the service workload identification, which identifies the application that originated the I/O. The journaled information may be employed for performing forensic analysis of data corruption events or to perform security audits, etc., for example, by an operator at an operator panel 22 at the primary site, or at an operator panel 770 at the secondary site, or through the host system 12 of FIG. 1 or systems 401 or 411 of FIG. 4.

The service workload identification identifies the owning application that provided the I/O, and allows a determination of which application updated what data when. The journal entries also show, via the consistency group, all other write I/Os to that or related volumes at that specific time as well as times previous to the specific time in question. This information can be used to determine which application did a write I/O that corrupted what data and at what specific time. Further, using this information with previous journal entries can allow determination of a write sequence by one application or others that may have led to the data corruption. In addition, subsequent journal entries may also indicate other data corruptions that may have occurred as the result of the first corruption event. The tape may also be archived for future analysis if needed. In one example, a continuous data protection application may provide the application interface to the journal, either in cache or from tape.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage system configured to write data supplied from a host to data storage in accordance with write I/O operations of owning applications, comprising:
   a workload manager configured to direct the processing of supplied data in accordance with a write I/O of one of said owning applications, configured to provide service workload identification for describing said write I/O, said service workload identification comprising at least a class of service defined for said owning application by said host;
   at least one storage subsystem configured to add said service workload identification to record set information for said data, and
   a journal management system configured to store information from said record set information in a journal, including said service workload identification.

2. The data storage system of claim 1, wherein said at least one storage subsystem is configured to add said service workload identification into a Read Record Set prefix, and said journal management system is configured to provide said information from said Read Record Set prefix to said journal.

3. The data storage system of claim 2, wherein said workload manager is configured to provide said service workload identification for a defined extent Channel Command Word (CCW) which provides said service workload identification to said at least one storage subsystem for said Read Record Set prefix.

4. The data storage system of claim 2, wherein said workload manager is configured to provide said service workload identification for a prefix Channel Command Word (CCW) which provides said service workload identification to said at least one storage subsystem for said Read Record Set prefix.

5. The data storage system of claim 1, wherein said class of service comprises I/O priority information, and wherein said workload manager is configured to select said I/O priority information of said class of service.

6. A data storage system, comprising:
   a plurality of data storage devices; and
   at least one storage control system configured to store data supplied from a host to at least one of said data storage devices in accordance with write I/O operations of a plurality of owning applications, comprising:
   a workload manager configured to direct the processing of supplied data in accordance with a write I/O of one of said owning applications, configured to provide service workload identification for describing said write I/O, said service workload identification comprising at least a class of service defined for said owning application by said host;
   at least one storage subsystem control configured to add said service workload identification to record set information for said data, and
   a journal management system configured to store information from said record set information in a journal, including said service workload identification.

7. The data storage system of claim 6, wherein said at least one storage subsystem control is configured to add said service workload identification into a Read Record Set prefix, and said journal management system is configured to provide said information from said Read Record Set prefix to said journal.

8. The data storage system of claim 7, wherein said workload manager is configured to provide said service workload identification for a defined extent Channel Command Word (CCW) which provides said service workload identification to said at least one storage subsystem control for said Read Record Set prefix.

9. The data storage system of claim 7, wherein said workload manager is configured to provide said service workload identification for a prefix Channel Command Word (CCW) which provides said service workload identification to said at least one storage subsystem control for said Read Record Set prefix.

10. The data storage system of claim 6, wherein said class of service comprises I/O priority information, and wherein said workload manager is configured to select said I/O priority information of said class of service.

11. A data storage system configured to write data supplied from a host to primary and secondary data storage in accordance with write I/O operations of owning applications, comprising:
    a secondary storage system configured to store supplied data to said secondary data storage; and
    a primary storage system configured to store data supplied from a host to said primary data storage in accordance with write I/O of one of said owning applications, and to supply said data for said secondary data storage system, said primary storage system additionally comprising:
    a workload manager configured to direct the processing of said supplied data in accordance with a write I/O of one of said owning applications, configured to provide service workload identification for describing said write I/O, said service workload identification comprising at least a class of service defined for said owning application by said host;
    at least one storage subsystem control configured to add said service workload identification to record set information for said data, and
    a journal management system configured to store information from said record set information in a journal, including said service workload identification.

12. The data storage system of claim 11, wherein said primary storage system at least one storage subsystem control is configured to add said service workload identification into a Read Record Set prefix, and said journal management system is configured to provide said information from said Read Record Set prefix to said journal.

13. The data storage system of claim 12, wherein said primary storage system workload manager is configured to provide said service workload identification for a defined extent Channel Command Word (CCW) which provides said service workload identification to said at least one storage subsystem control for said Read Record Set prefix.

14. The data storage system of claim 12, wherein said primary storage system workload manager is configured to provide said service workload identification for a prefix Channel Command Word (CCW) which provides said service workload identification to said at least one storage subsystem control for said Read Record Set prefix.

15. The data storage system of claim 11, wherein said class of service comprises I/O priority information, and wherein said primary storage system workload manager is configured to select said I/O priority information of said class of service.

* * * * *